(12) United States Patent
Bostic et al.

(10) Patent No.: US 10,067,791 B2
(45) Date of Patent: *Sep. 4, 2018

(54) METHODS AND APPARATUS FOR RESOURCE MANAGEMENT IN CLUSTER COMPUTING

(71) Applicant: Adobe Systems Incorporated, San Jose, CA (US)

(72) Inventors: Sandford P. Bostic, Riverton, UT (US); Stephen Paul Reiser, West Orem, UT (US); Andrey J. Bigney, Saratoga Springs, UT (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/987,406

(22) Filed: Jan. 4, 2016

(65) Prior Publication Data

US 2016/0117194 A1   Apr. 28, 2016

Related U.S. Application Data

(63) Continuation of application No. 14/165,396, filed on Jan. 27, 2014, now Pat. No. 9,262,218, which is a
(Continued)

(51) Int. Cl.
*G06F 9/46* (2006.01)
*G06F 9/50* (2006.01)
(Continued)

(52) U.S. Cl.
CPC ............. *G06F 9/50* (2013.01); *G06F 9/5072* (2013.01); *G06F 11/30* (2013.01);
(Continued)

(58) Field of Classification Search
None
See application file for complete search history.

(56) References Cited

U.S. PATENT DOCUMENTS 6,192,410 B1 * 2/2001 Miller ................ H04L 1/1685
370/352
6,202,080 B1 * 3/2001 Lu ...................... G06F 9/5083
709/219

(Continued)

OTHER PUBLICATIONS

Sun Microsystems, Inc., "Beginner's Guide to Sun Grid Engine 6.2 Installation and Configuration", White Paper, Sep. 2008, Sun_Grid_Engine_2008.pdf, pp. 1-40.
(Continued)

*Primary Examiner* — Hiren Patel
(74) *Attorney, Agent, or Firm* — Brake Hughes Bellermann LLP

(57) ABSTRACT

Embodiments of an event-driven resource management technique may enable the management of cluster resources at a sub-computer level (e.g., at the thread level) and the decomposition of jobs at an atomic (task) level. A job queue may request a resource for a job from a resource manager, which may locate a resource in a resource list and grant the resource to the job queue. After the resource is granted, the job queue sends the job to the resource, on which the job may be partitioned into tasks and from which additional resources may be requested from the resource manager. The resource manager may locate additional resources in the list and grant the resources to the resource. The resource sends the tasks to the granted resources for execution. As resources complete their tasks, the resource manager is informed so that the status of the resources in the list can be updated.

20 Claims, 11 Drawing Sheets

Related U.S. Application Data continuation of application No. 12/871,699, filed on Aug. 30, 2010, now Pat. No. 8,640,137.

(51) Int. Cl.
  *G06F 11/34* (2006.01)
  *G06F 11/30* (2006.01)
  *G06F 17/30* (2006.01)

(52) U.S. Cl.
  CPC .... *G06F 11/3466* (2013.01); *G06F 17/30424* (2013.01); *G06F 2209/5017* (2013.01)

(56) References Cited

U.S. PATENT DOCUMENTS

| | | | |
|---|---|---|---|
| 6,820,122 B1 | 11/2004 | Mandler et al. | |
| 6,988,139 B1 | 1/2006 | Jervis | |
| 7,596,788 B1 | 9/2009 | Shpigelman | |
| 7,689,694 B2 | 3/2010 | Kato et al. | |
| 7,779,413 B2 | 8/2010 | Suzuki | |
| 7,783,695 B1 | 8/2010 | Tyrrell et al. | |
| 7,814,492 B1 | 10/2010 | Creemer et al. | |
| 7,937,705 B1 | 5/2011 | Prael et al. | |
| 7,987,467 B2 | 7/2011 | Chan et al. | |
| 8,136,119 B2 | 3/2012 | Dasari et al. | |
| 8,144,149 B2 | 3/2012 | Jiao et al. | |
| 8,214,686 B2 * | 7/2012 | Ueda | G06F 9/4856 714/15 |
| 8,379,258 B2 * | 2/2013 | Uchida | G06F 21/00 358/1.15 |
| 8,438,131 B2 | 5/2013 | Prorock et al. | |
| 8,640,137 B1 * | 1/2014 | Bostic | G06F 9/5072 718/101 |
| 8,996,469 B2 | 3/2015 | Bigney | |
| 9,262,218 B2 * | 2/2016 | Bostic | G06F 9/5072 |
| 9,804,889 B2 * | 10/2017 | Adams | G06F 9/5022 |
| 2002/0078130 A1 | 6/2002 | Thornton | |
| 2002/0156832 A1 | 10/2002 | Duri et al. | |
| 2002/0194245 A1 | 12/2002 | Simpson et al. | |
| 2002/0199045 A1 | 12/2002 | Browning et al. | |
| 2003/0154115 A1 * | 8/2003 | Lahey | G06Q 10/10 718/106 |
| 2005/0038852 A1 | 2/2005 | Howard | |
| 2005/0165881 A1 | 7/2005 | Brooks et al. | |
| 2005/0278441 A1 | 12/2005 | Bond et al. | |
| 2005/0283782 A1 | 12/2005 | Lu et al. | |
| 2006/0048157 A1 | 3/2006 | Dawson et al. | |
| 2006/0059492 A1 | 3/2006 | Fellenstein et al. | |
| 2006/0064411 A1 | 3/2006 | Gross et al. | |
| 2006/0168584 A1 | 7/2006 | Dawson | |
| 2006/0195508 A1 | 8/2006 | Bernadin et al. | |
| 2007/0180451 A1 | 8/2007 | Ryan et al. | |
| 2007/0277174 A1 | 11/2007 | Cai | |
| 2008/0063423 A1 * | 3/2008 | Matoba | G03G 15/50 399/76 |
| 2008/0098039 A1 | 4/2008 | Kruis et al. | |
| 2008/0115143 A1 | 5/2008 | Shimizu et al. | |
| 2008/0134197 A1 | 6/2008 | Dasari et al. | |
| 2008/0216081 A1 | 9/2008 | Jackson | |
| 2008/0229320 A1 | 9/2008 | Ueda | |
| 2008/0256223 A1 | 10/2008 | Chan et al. | |
| 2008/0256549 A1 | 10/2008 | Liu et al. | |
| 2009/0025004 A1 | 1/2009 | Barnard et al. | |
| 2009/0158293 A1 | 6/2009 | Kajihara | |
| 2009/0177671 A1 * | 7/2009 | Pellegrini | G06F 9/5038 |
| 2009/0210282 A1 | 8/2009 | Elenbaas et al. | |
| 2009/0288095 A1 | 11/2009 | Donadeo | |
| 2009/0320037 A1 | 12/2009 | Gokhale et al. | |
| 2010/0050181 A1 | 2/2010 | Zhang | |
| 2010/0070976 A1 * | 3/2010 | Bessho | G06F 11/32 718/102 |
| 2010/0088205 A1 | 4/2010 | Robertson | |
| 2010/0146515 A1 | 6/2010 | Shpigelman | |
| 2010/0186020 A1 | 7/2010 | Maddhirala et al. | |
| 2010/0198784 A1 | 8/2010 | Serlet | |
| 2010/0333094 A1 * | 12/2010 | Restall | G06F 9/5027 718/102 |
| 2011/0110647 A1 | 5/2011 | Prorock et al. | |
| 2011/0131579 A1 * | 6/2011 | Tsukamoto | G06F 9/5027 718/101 |
| 2011/0138055 A1 | 6/2011 | Jiao et al. | |
| 2011/0161294 A1 | 6/2011 | Vengerov et al. | |
| 2012/0066206 A1 | 3/2012 | Chappell et al. | |
| 2013/0104135 A1 | 4/2013 | Cai et al. | |
| 2013/0219397 A1 | 8/2013 | Adams et al. | |
| 2013/0227585 A1 * | 8/2013 | Ichikawa | G06F 9/50 718/104 |

OTHER PUBLICATIONS

Buyya, et al., "An Arichitecture for a Resource Management and Scheduling System in a Global Computational Grid", IEEE 2000, Buyya_2000.pdf, pp. 1-7.

U.S. Appl. No. 12/871,701, filed Aug. 30, 2010, Andrey J. Bigney, et al.

U.S. Appl. No. 12/871,712, filed Aug. 30, 2010, David C. Adams, et al.

SQLite, "About SQLite" downloaded from http://eee.sqlite.org/about.html , Aug. 30, 2012, 2 pages.

Oracle, "Programmer's Reference Guide", 11g Release 2, Jun. 25, 2010, 287 pages.

Thomas Fielding, "Architectural Styles and the Design of Network-Based Software Architectures," 2000, 180 pages.

Etison, et al., "A Short Survey of Commercial Cluster Batch Schedulers,", 2005, 4 pages.

Oracle Corporation, "How the System Operates", 2010, 4 pages.

Cesare Pautasso, "Restful Web Services," Oct. 4, 2008, 20 pages.

SETI League, "What is SETI@home?", Jan. 14, 2006, 2 pages.

Evolane, SQLite, last modified Aug. 25, 2009, 3 pages.

Gentzsch, "Sun Grid Engine: Towards Creating a Compute Power Grid," Proceedings of the 1$^{st}$ International Symposium on Cluster Computing and the Grid (CCGRID '01), IEEE 2001, 2 pages.

Pautasso, et al., "Restful Web Services vs. "Big" Web Services: Making the Right Architectural Decision," Copyright is held by the International World Wide Web Conference Committee (IW3C2). www 2008, Apr. 21-25, 2008, Beijing, China, ACM 978-1-60558-085-2/08/04, 10 pages.

Notice of Allowance in related U.S. Appl. No. 12/871,699, dated Sep. 18, 2013.

Notice of Allowance in related U.S. Appl. No. 14/165,396, dated Oct. 6, 2015.

\* cited by examiner

METHODS AND APPARATUS FOR RESOURCE MANAGEMENT IN CLUSTER COMPUTING

CROSS-REFERENCE TO RELATED APPLICATIONS

This application is a continuation application of and claims priority to U.S. patent application Ser. No. 14/165,396, filed on Jan. 27, 2014, which is a continuation application of and claims priority to U.S. patent application Ser. No. 12/871,699, filed on Aug. 30, 2010 and issued as U.S. Pat. No. 8,640,137, the contents of both of which are incorporated herein by reference in their entirety.

BACKGROUND

Cluster Computing

Conceptually, computer clusters or grids are a collection of computing resources (e.g., computers, servers, storage devices or systems, printers, scientific instruments, etc.) connected through a network or networks. Cluster middleware aggregates these resources and provides access to the resources when needed. Typically, a cluster computing system may include compute nodes configured to execute jobs and one or more nodes that implement the middleware; these nodes may be referred to as management nodes, with the compute nodes being among the managed resources. Generally, in these cluster computing systems, a job submitter submits jobs to the cluster. The middleware dispatches the jobs to various compute nodes. The compute nodes perform their assigned jobs and return results, for example back to a management node which aggregates results from one or more compute nodes and provides the results to the job submitter.

Metadata Storage

Many cluster computing systems generate metadata that is used, for example, in tracking the configuration and availability of resources, in tracking the distribution, status and progress of jobs on the cluster, and possibly for other information that may be used in some cluster applications such as order, shipping, and delivery information. Job metadata may be generally defined as including any information that may be used in executing jobs in a cluster system. Many conventional cluster systems employ a centralized database or databases to store this metadata. The centralized database or databases are "fixed"; that is, the database(s) reside on servers or storage systems. Users may access, or may request access to, the databases, for example to determine the status of jobs, orders, shipping, delivery, and so on. However, as a cluster system grows, the fixed, centralized database architecture may result in heavy load on the databases, reducing the cluster's ability to scale. Thus, the fixed, centralized database architecture may be a bottleneck in conventional cluster systems.

Metadata Transport

Many cluster computing systems transport job metadata, for example between management nodes and compute nodes or between cluster nodes and a centralized database, according to a transport architecture that employs some protocol, for example via XML encoded structures (SOAP, XML-RPC) or via a proprietary protocol (ICE, raw sockets etc). This conventional transport architecture requires many protocol messages encapsulating various metadata to be passed between cluster nodes; these messages are often deserialized, parsed, modified, and serialized at the nodes, which requires CPU processing time. Thus, this conventional transport architecture may result in performance bottlenecks due to CPU and network bandwidth requirements to support this transporting and node processing of many protocol messages.

Cluster computing systems that do not transport metadata for jobs according to the above transport architecture may instead allow direct access to the centralized database(s). However, this architecture may result in scalability issues since access to the centralized database(s) generally have a fixed available bandwidth.

Cluster Resource Management

Conventional cluster computing systems exist that may manage a collection of network resources. However, these conventional systems typically involve a bulky infrastructure that requires significant setup and management by system administrators. Examples of such conventional cluster systems include Oracle Corporation's Grid Engine technology (formerly Sun Grid Engine technology), and the SETI@Home project. Generally, in these conventional cluster computing systems, it is required that a managed node (e.g., a compute node) has an installed client or agent that communicates with one or more management nodes. The agent relays status, performance, and availability information for the managed node to the management node(s); the management node(s) (the middleware) make job distribution decisions according to the information received from the managed node(s). However, these conventional cluster computing systems generally use a polling technique in which a management node or nodes periodically poll the managed resources on the cluster to gather this information. This polling generates considerable network traffic, which consumes available bandwidth and thus adds significantly to the load of the cluster system. Furthermore, these conventional cluster computing systems generally restrict which types of systems may be used as cluster resources, since a node must be able to support the agent provided by the infrastructure.

SUMMARY

Various embodiments of methods, apparatus, and computer-readable storage media for cluster computing are described. At least some embodiments may provide a mobile state object for storing and transporting job metadata that uses a database as an envelope for the metadata. At least some embodiments may provide a state tracking technique that enables real-time tracking of jobs in the cluster via the state object. At least some embodiments may provide an event-driven resource management architecture and technique that enables the management of cluster resources at a sub-computer level and that enables the decomposition and distribution of jobs at an atomic level to available resources. The state object, the state tracking technique, and the resource management architecture and technique may be individually implemented in cluster computing systems, or two or more of these techniques may be implemented in combination in cluster computing systems. Embodiments of the various cluster computing components, methods and techniques may be implemented, for example, in cluster computing systems that implement distributed applications.

Embodiments of an event-driven resource management architecture and technique are described that enable the management of cluster resources at a sub-computer level (e.g., at the thread level) and that enable the decomposition and distribution of jobs at an atomic (task) level to available resources. Embodiments may provide an 'agentless' resource management system in which any system can become part of the cluster without the need to install an agent. A process that wants to obtain a resource makes a simple call to a resource manager requesting a resource and provides a 'post back' by which the process can be informed when a resource is available.

In at least some embodiments of a cluster computing system implementing the resource management technique, a resource manager on the cluster maintains a list of cluster resources. When a new compute node joins the cluster, or when a compute node leaves the cluster, the resource manager may be informed so that the resource list may be updated accordingly. A job may be submitted to a job queue for execution by a distributed application on the cluster. The job queue may request an initial resource for the job from the resource manager when ready to begin the job. In response to the request, the resource manager may locate a resource in the list and pass information about the resource to the job queue. The resource manager may also change the status of the resource in the resource list, for example to "locked." If no resource is currently available, in some embodiments the resource manager may respond to inform the job queue that a resource is not available at this time. When a resource becomes available, the resource manager then informs the job queue. In at least some embodiments, the resource manager may either respond to a resource request to affirm that the request has been received and will be fulfilled at some time in the future, or respond to inform the requestor that the request could not be registered. This response is not dependent on the number of resources that may or may not be available at that moment in time.

After receiving the indication of the initial resource from the resource manager, the job queue sends the job to the initial resource for execution, for example to a compute node. The initial resource may partition the job into a plurality of tasks and may then request additional resources from the resource manager. The resource manager may locate additional resources in the list and pass information about the resources to the initial resource. The resource manager may also change the status of the resources in the resource list, for example to "locked." If not enough resources are currently available to meet the request for additional resources, the resource manager may allocate resources to the initial resource to meet the request as the resources become available. The initial resource sends the tasks to the allocated additional resources for execution. The job is executed on the allocated resources; as resources complete their assigned tasks, the job informs the resource manager so that the resource manager can update the status of the freed resources in the resource list and reassign the resources to meet other requests.

Since the resource management technique does not require an agent on the compute nodes, the technique is easy to integrate with existing systems. Simple request/free/create calls are provided that allow nodes to be quickly and easily joined to a resource manager and allow resources to be easily allocated to and freed by processes without going through an agent on the node. In addition, the technique may provide load-balancing of resources at a much faster rate, for example at a subsecond rate, than can be achieved in conventional cluster systems. In addition, because the resource management technique allows tasks and resources to be managed at a more atomic level than conventional cluster systems, the resource management technique may work with units (tasks and resources) that the resource manager treats as equivalent or the same—all tasks are the same, and all resources are the same, from the resource manager's perspective, and any task can be assigned to any available resource. Thus, the resource management technique may load-balance the cluster more evenly and efficiently than can be done in conventional cluster systems that must match particular jobs to particular cluster resources at a higher, more complex level.

In at least some embodiments, the resource manager does not need to be aware of the particular capabilities or configurations of individual machines in the cluster. From the resource manager's perspective, all of the resources are the same. Thus, a requestor seeking resources may simply inform the resource manager of the number of resources required, without having to specify any particular aspects of a desired resource. Similarly, a computer system joining the cluster does not need to inform the resource manager of any particular capabilities of the computer system other than the number of resources that the computer system is providing. Furthermore, the resource manager does not have to obtain and evaluate particular configurations of computer systems in the cluster to determine if their configurations support particular jobs for which resources are requested. Instead, a requestor simply informs the resource manager of how many resources it needs, and the resource manager grants resources as they become available.

In some embodiments, a limit may be placed on the number of cluster resources that may be allocated at a given time to a given job to prevent particular jobs from overallocating resources on the cluster. In some embodiments, a resource limit may be passed to the compute node to which the job is sent; the application code on the compute node is thus informed of the maximum number of resources that the job can be allocated at a given time. When the compute node requests additional resources for the job, no more resources than this limit are requested.

Figure 1A:
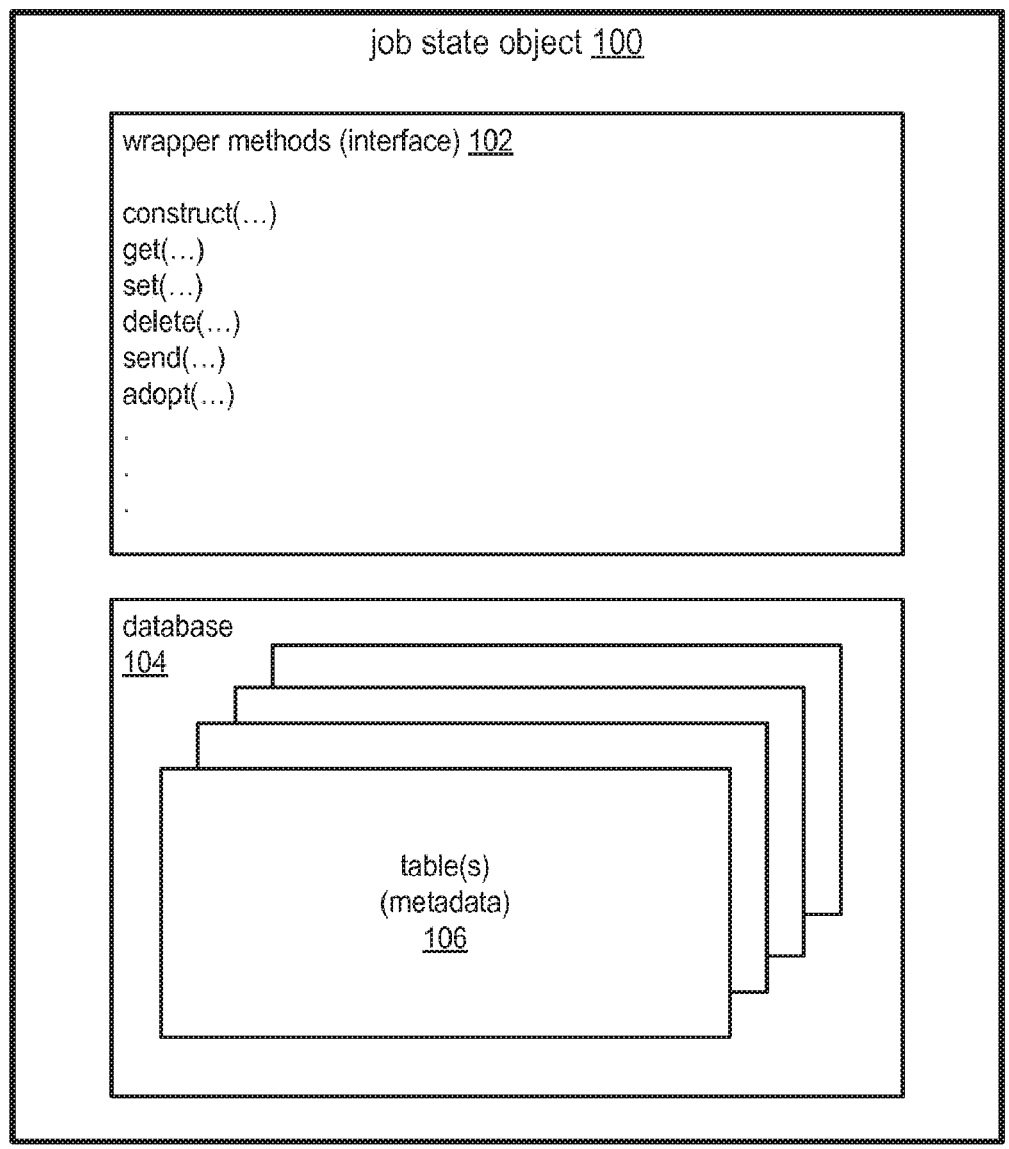
FIG. 1A illustrates a state object file at a high level, according to at least some embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of methods, apparatus, and computer-readable storage media for cluster computing are described. At least some embodiments may provide a mobile state object for storing and transporting job metadata that uses a database as an envelope for the metadata. At least some embodiments may provide a state tracking technique that enables real-time tracking of jobs in the cluster via the state object. At least some embodiments may provide an event-driven resource management architecture and technique that enables the management of cluster resources at a sub-computer level (e.g., at the thread level on a multicore computer system) and that enables the decomposition and distribution of jobs at an atomic (task) level to available resources. The state object, the state tracking technique, and the resource management architecture and technique may be individually implemented in cluster computing systems, or two or more of these techniques may be implemented in combination in cluster computing systems. Embodiments of the various cluster computing components, methods and techniques as described herein may be implemented by program instructions that may be stored in a computer-readable storage medium, and that are executable by one or more processors (e.g., one or more CPUs and/or GPUs).

Embodiments of the various cluster computing components, methods and techniques as described herein may be implemented, for example, in cluster computing systems that implement distributed applications. A given cluster computing system may implement a single distributed application, or may implement two or more distributed applications. In these distributed applications, various application components or processes may be implemented on two or more compute nodes on the cluster. Each compute node may be configured with application code for performing a job or portion of a job (referred to herein as a task) that is submitted to the application for execution. In some implementations, each compute node may include the same application code for executing the same component(s) or process(es) of the distributed application. In other implementations, at least some compute nodes may include different application code for executing different components or processes of the distributed application. A job submitted to a distributed application on a cluster computing system may require different processing stages, and thus a job, during execution, may be passed from one compute node for performing one process of the application to another compute node for performing another process of the application. In addition, in at least some distributed applications, a job submitted to the distributed application, or a portion of a job, may be subdivided into parts executable by the same application process on different compute nodes, and the parts may be distributed among the compute nodes on the cluster for processing.

An example application that may be implemented on a cluster computing system implemented according to embodiments as described herein is a data warehousing application. In a data warehousing application, the application may maintain a data store. Customers request data from the data store. However, the data may not be not stored in a format that is directly consumable by the customer. Each particular customer request is, or generates, a job. When the job is executed by the application, the cluster computing system implemented according to embodiments subdivides the job into a plurality of data feed tasks that are distributed among resources in the cluster for execution. Each data feed process extracts a portion of the data and generates a data feed. The data in the feeds may be converted into a format that the customer wants and merged into a file or files. The file or files may then be delivered to the customer. Embodiments of the resource management technique as described herein may be used to manage resources used in processing the job. Embodiments of the state object as described herein may be used to maintain metadata for the job. To perform different portions of job processing, the job may be passed from one compute node on the cluster to another compute node. When a job is passed from one compute node to another compute node, the state object is transferred from the compute node to the other compute node. Embodiments of the state tracking technique as described herein may thus be used to track the location of the state object on the cluster during job execution.

State Objects

Embodiments may provide a mobile state object for storing and transporting job metadata that uses a database as an envelope for the metadata. The state object is essentially a stand-alone database file. FIG. 1A illustrates a state object file at a high level, according to at least some embodiments. A job state object 100 may include a database 104 that stores the job metadata; the database may include one or more tables 106 that store metadata including but not limited to job state information. The job state object 100 may also include wrapper methods 102, including but not limited to methods for accessing the metadata in database 104.

Some embodiments may employ a small, single process database as the database engine. In, some embodiments, instead of a single process database engine, a database engine may be employed that allows concurrent access to the database by multiple processes or threads. Since the entire database 104 exists within a single file (job state object 100), complex, extensible applications may be created on the same base state object; the state object 100 can be sent across the network with the state intact, along with history of the object. In some embodiments, an SQLite technology database engine may be used. SQLite is a public domain software library that implements a self-contained, serverless, zero-configuration, transactional SQL database engine. Other embodiments may use other technologies as the database engine. For example, Berkeley DB (BDB) database technology may be used in some embodiments. SQLite and BDB are given as examples of single file relational database engine technologies that may be used in embodiments; generally, any single file relational database engine may be used. To support the database engine, compute nodes on the cluster may be configured with a runtime library for the database engine via which applications or other entities may access the state file database.

By storing job metadata in a database, the metadata can be easily extended. In addition, simple database engine queries may be used to address the metadata, modify the metadata, and so on. By using the database as the message transport, deserializing, parsing, and so on is not required as in conventional cluster systems that employ a message protocol such as) ML to transport metadata; instead, the metadata may be accessed or modified via database queries. This allows for more flexible applications, and less application overhead in processing the metadata on the cluster nodes.

In at least some embodiments, the database may be a relational database. Since the state object 100 is a relational database, at least some embodiments may store a log history of a job with the state object (e.g., in the database), enabling better diagnostics than in conventional cluster systems. Furthermore, state information for a job may be easily tracked as it moves through the cluster. Furthermore, the progress or status of a complex job can be accessed and viewed in real time.

Figure 1B:
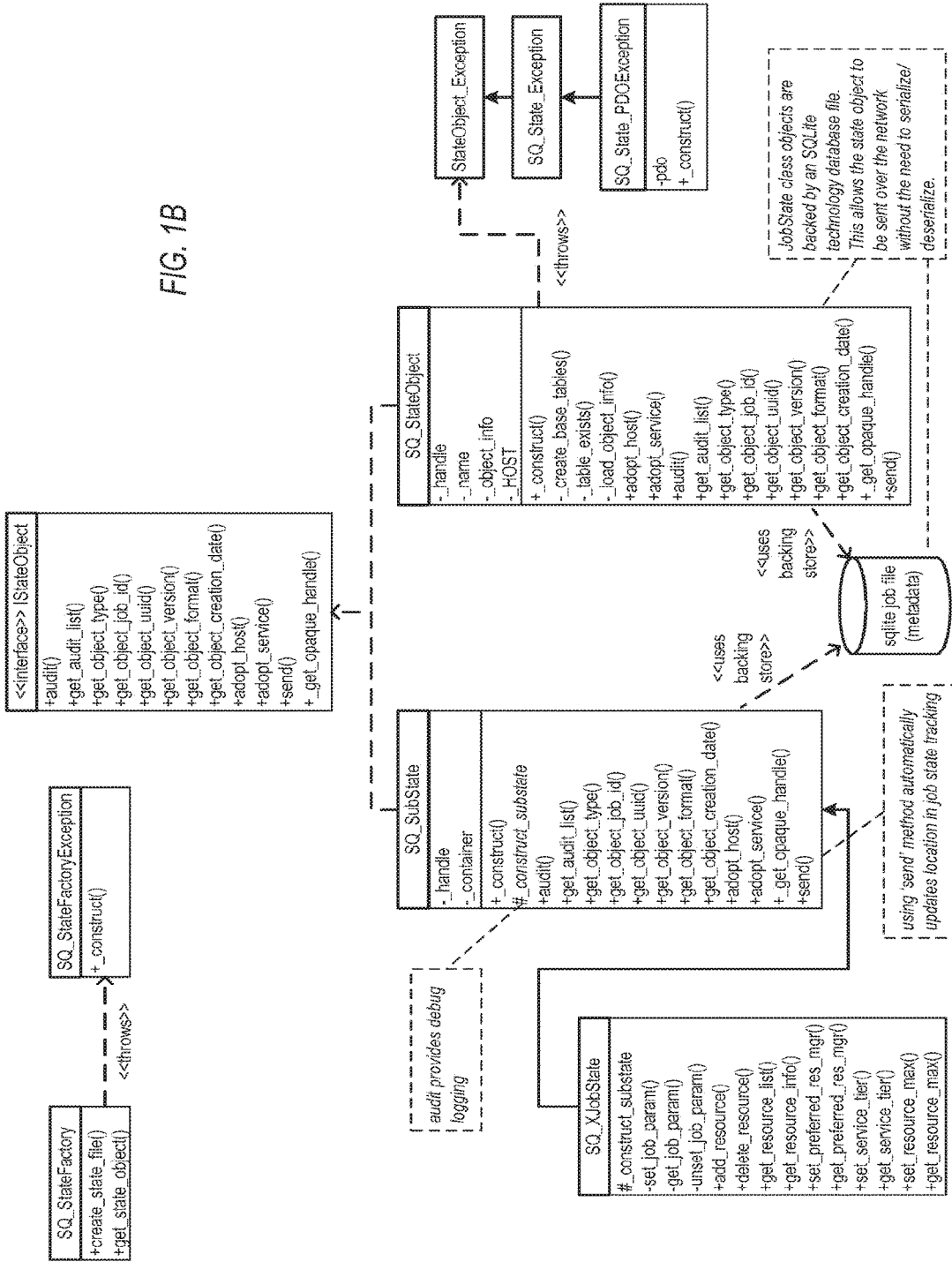
FIG. 1B illustrates an example job state file class diagram, according to some embodiments.

FIG. 1B illustrates an example job state file class diagram, according to some embodiments. Note that the job state file class diagram is given by way of example, and is not intended to be limiting. In this example, the class objects are backed by an SQLite technology database file. This allows the state object to be sent over the network without the need to serialize/deserialize a message, as is required in conventional techniques that use XML or similar technologies. By using a database as the object message, the object may be queried for only the attributes of interest. For example, a requestor simply queries the remote machine holding the job (and thus the state object) to extract only the portions of data needed. This reduces network and CPU load when compared to conventional techniques. In contrast, in conventional techniques using XML or similar messaging, the entire message must first be transferred and then parsed, and only then can the desired data be extracted. Other database technologies may be use; for example, Berkeley DB (BDB) embedded database technology may be used in some embodiments. SQLite and BDB are given as examples of single file relational database engine technologies that may be used in embodiments; generally, any single file relational database engine may be used.

Job State Object Flowchart

Figure 1C:
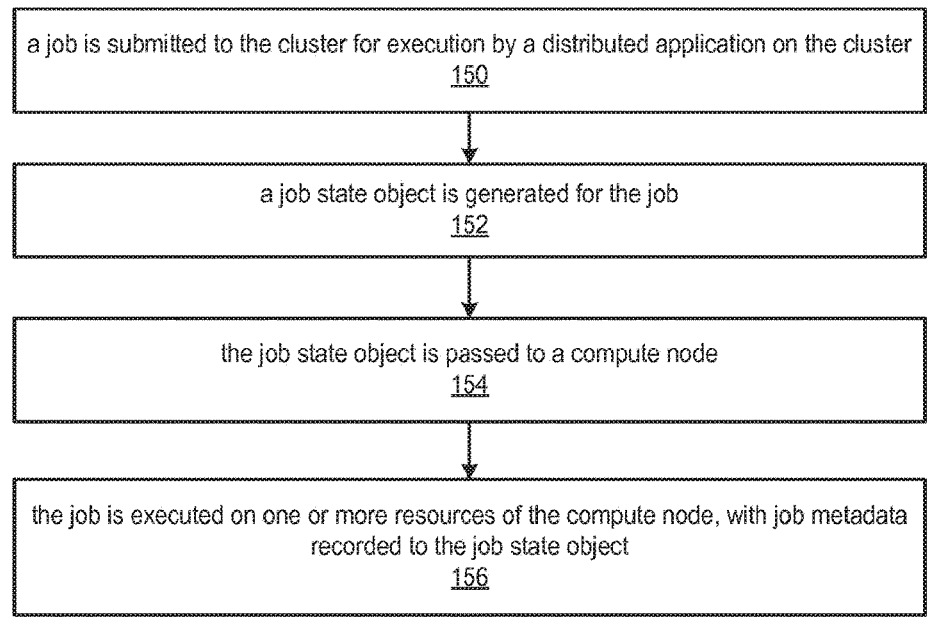
FIG. 1C is a high-level flowchart illustrating an example method for using a state object in a cluster computer system to record job metadata, according to at least some embodiments.

FIG. 1C is a high-level flowchart illustrating an example method for using a state object in a cluster computer system to record job metadata, according to at least some embodiments. As indicated at 150, a job is submitted to the cluster for execution by a distributed application on the cluster. As indicated at 152, a job state object is generated for the job. As indicated at 154, the job state object is passed to a compute node on the cluster. As indicated at 156, the job is executed on one or more resources of the compute node, with job metadata recorded to the job state object.

State Objects on Compute Nodes

Figure 1D:
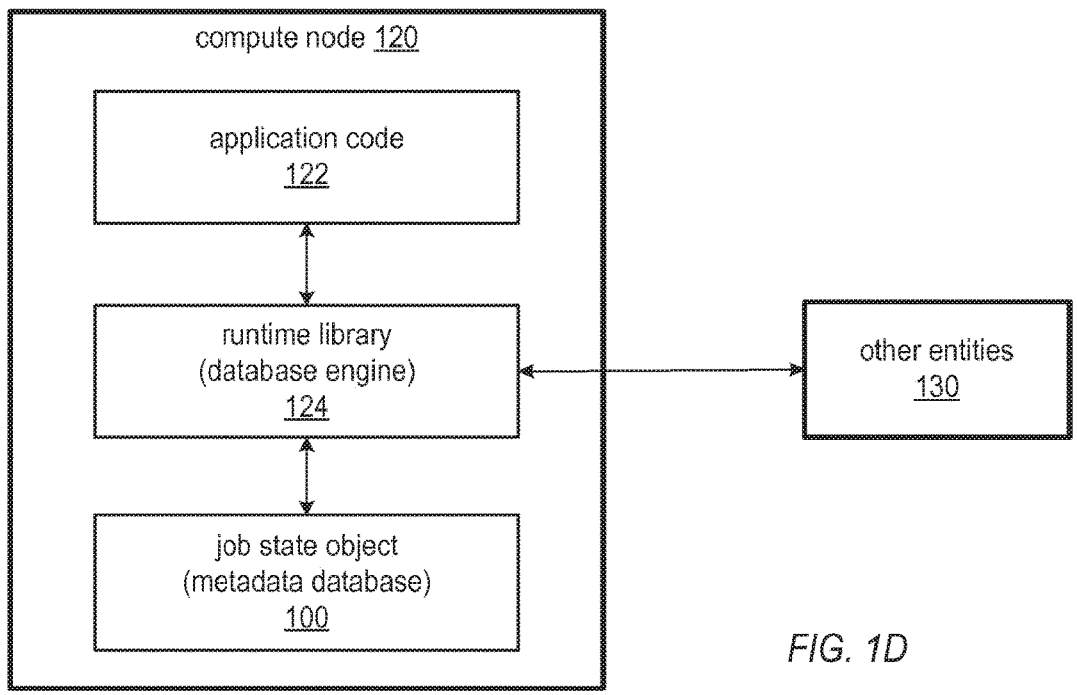
FIG. 1D illustrates an example configuration of a compute node that implements a state object, according to at least some embodiments.

FIG. 1D illustrates an example configuration of a compute node that implements a state object, according to at least some embodiments. In FIG. 1C, job state object 100 resides on compute node 120; the state object 100 includes the job metadata database. The compute node 120 includes application code 122 and a runtime library 124 for the database engine. In some embodiments, the database engine may be an SQLite technology database engine. Other embodiments may use other technologies as the database engine; for example, Berkeley DB (BDB) embedded database technology may be used in some embodiments. SQLite and BDB are given as examples of single file relational database engine technologies that may be used in embodiments; generally, any single file relational database engine may be used. Application code 122 may be configured to access the state object 100 according to the runtime library 124 to record job status, statistics, and so on as metadata in the database, or to obtain data from the database. In addition, other, external entities, such as other processes of the respective application, other applications, cluster management middleware, and cluster customers (e.g., a job originator) may access the state object 100 via database queries according to the runtime library 124.

In at least some embodiments, a web interface, or some other interface, may be provided via which a user (e.g., the job originator) may remotely request job information from a job state object via a web browser. In at least some embodiments, since the state object is mobile and may move from compute node to compute node on the cluster during job execution, this interface may first obtain a current location (e.g., a URL) of the respective state object according to a state tracking technique as described herein. In some embodiments, the interface may directly access the state object. In other embodiments, if the data center hosting the cluster does not wish to allow external access of data, the data may be proxied for access by the customer so that external access to the data is not granted.

In some embodiments, at least some compute nodes on a cluster may be preconfigured with application code 122 and runtime library 124. However, it is possible and contemplated to package at least some application code in the state object 100. In an embodiment that packages application code in the state object 100, a compute node may be configured for executing at least a portion of a respective job according to the application code packaged in a state object 100 delivered to the compute node.

State Object Granularity

While embodiments are generally described that employ a job state object, i.e. a state object at the job level, it is possible and contemplated to implement state objects as described herein at the task level. In embodiments employing a job state object, when a compute node is initially assigned a job and thus obtains a state object for the job, the compute node may partition the job into tasks, obtain other cluster resources (e.g., other compute nodes or threads on other compute nodes) to execute the tasks, and deliver the tasks to the other cluster resources for execution. In at least some embodiments, this may be performed according to an embodiment of the resource management technique described herein. In some embodiments, a task state object, similar but not necessarily identical to the job state object, may be distributed to a resource when a task is assigned to the resource. In some embodiments employing task-level state objects, the task state objects may be tracked using a state tracking technique similar to the job state tracking technique described herein.

Resource Management

At least some embodiments may provide an event-driven resource management architecture and technique that enables the management of cluster resources at a sub-computer level (e.g., at the thread level on a multicore computer system) and that enables the decomposition and distribution of jobs at an atomic (task) level to available resources. Embodiments may provide an 'agentless' resource management system in which any system can become part of the cluster without the need to install an agent. A process that wants to obtain a resource makes a simple call to a resource manager requesting a resource and provides a 'post back' by which the process can be informed when a resource is available. The process may, for example, be a job scheduling mechanism requesting an initial resource for a job, or a resource holding a job requesting additional resources so that the job can be parceled out to other resources as tasks.

Figure 2A:
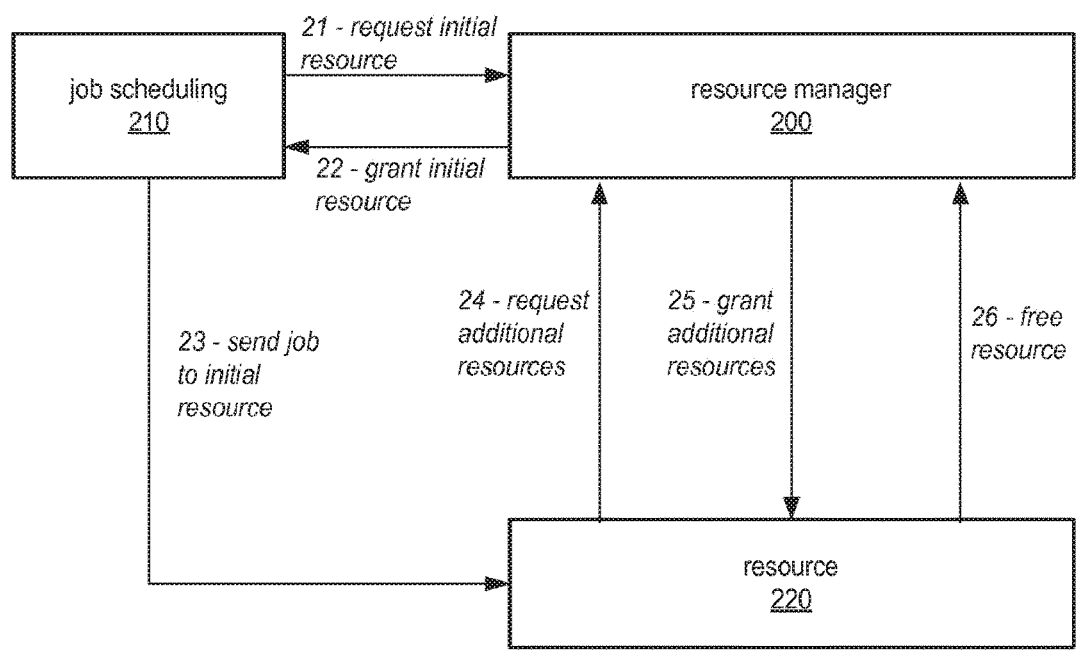
FIG. 2A illustrates an event-driven resource management technique at a high level, and shows the flow of resource management-related events for a typical job, according to at least some embodiments.

FIG. 2A illustrates an event-driven resource management technique at a high level, and shows the flow of resource management-related events for a typical job, according to at least some embodiments. At 21, a job scheduling mechanism 210 sends a request to a resource manager 200 asking for an initial resource for a job. At 22, when a resource is or becomes available (resource 220, in this example), the resource manager 200 informs the requestor (job scheduling mechanism 210) that the resource is available for the job. At 23, the job scheduling mechanism sends the job to the indicated resource 220. In at least some embodiments, the job may be analyzed on the resource 220 to determine how the job can be broken down into tasks, and thus a task count may be generated. At 24, the resource 220 requests additional resources from the resource manager 200. In at least some embodiments, the job on the resource 220 may generate and send the request for additional resources. At 25, when resources are or become available, the resource manager 200 informs the requestor (resource 220) that the resources are available. At 26, when a granted resource becomes free (e.g., when an assigned task is done with a resource), the resource manager 200 is informed, by the task itself or, alternatively, by the job.

In the event-driven resource management technique, unlike conventional cluster systems, the resource manager does not poll nodes for resource information. Instead, nodes (e.g., multicore computer systems, or other types or configurations of computer systems) that join the cluster as compute nodes may inform the resource manager(s) of the resources (e.g., threads) that the nodes have available. Information about these resources (e.g., location, capabilities, etc.) may be maintained in a resource available list or database. A process asks a resource manager for an available resource and provides a unique identifier (e.g., UUID) by which this resource request is to be known and a 'post back' address (e.g., a URL or RPC address) where it should be notified when the resource comes available. Once a resource is available, the resource manager will 'lock' that resource in the resource database so that other processes cannot access the resource, and then call the 'post back' provided the requesting process, providing the resource identification and the unique name (e.g., UUID) selected by the calling process. When the process is done with the resource, the process informs the resource manager that the resource is to be freed. The resource manager then unlocks the resource.

Because the resource management technique is event driven and does not require polling of compute nodes, the technique may provide significantly faster performance than conventional policy-based and poll-based resource management techniques. Furthermore, since the resource management technique does not require an agent on the compute nodes, the technique is easy to integrate with existing systems. Simple request/free/create calls are provided that allow nodes to be quickly and easily joined to a resource manager and allow resources to be easily allocated to and freed by processes without going through an agent on the node. Moreover, because the resource management technique may manage resources at a more atomic level than conventional cluster systems, the technique may be used to manage computers, portions of computers (e.g., threads), blocks of disks, and so on.

Because the resource management technique is event driven and does not require polling of compute nodes, the technique may provide load-balancing of resources at a much faster rate, for example at a subsecond rate, than can be achieved in conventional cluster systems. In addition, because the resource management technique allows tasks and resources to be managed at a more atomic level than conventional cluster systems, the resource management technique may work with units (tasks and resources) that the resource manager treats as equivalent or the same—all tasks are the same, and all resources are the same, from the resource manager's perspective, and any task can be assigned to any available resource. The resource manager does not have to perform evaluations of job profiles and resource profiles to match particular jobs to particular cluster resources. Thus, the resource management technique may load-balance the cluster more evenly and efficiently than can be done in conventional cluster systems that must match particular jobs to particular cluster resources at a higher, more complex level.

Embodiments of the resource management technique as described herein do not depend on the state object or state tracking technique described herein to perform resource management. Thus, embodiments of the resource management technique may be implemented in cluster computing systems that do not implement the state object or state tracking technique, as well as in cluster computing techniques that do implement the state object and state tracking technique.

Resource Management Flowchart

Figure 2B:
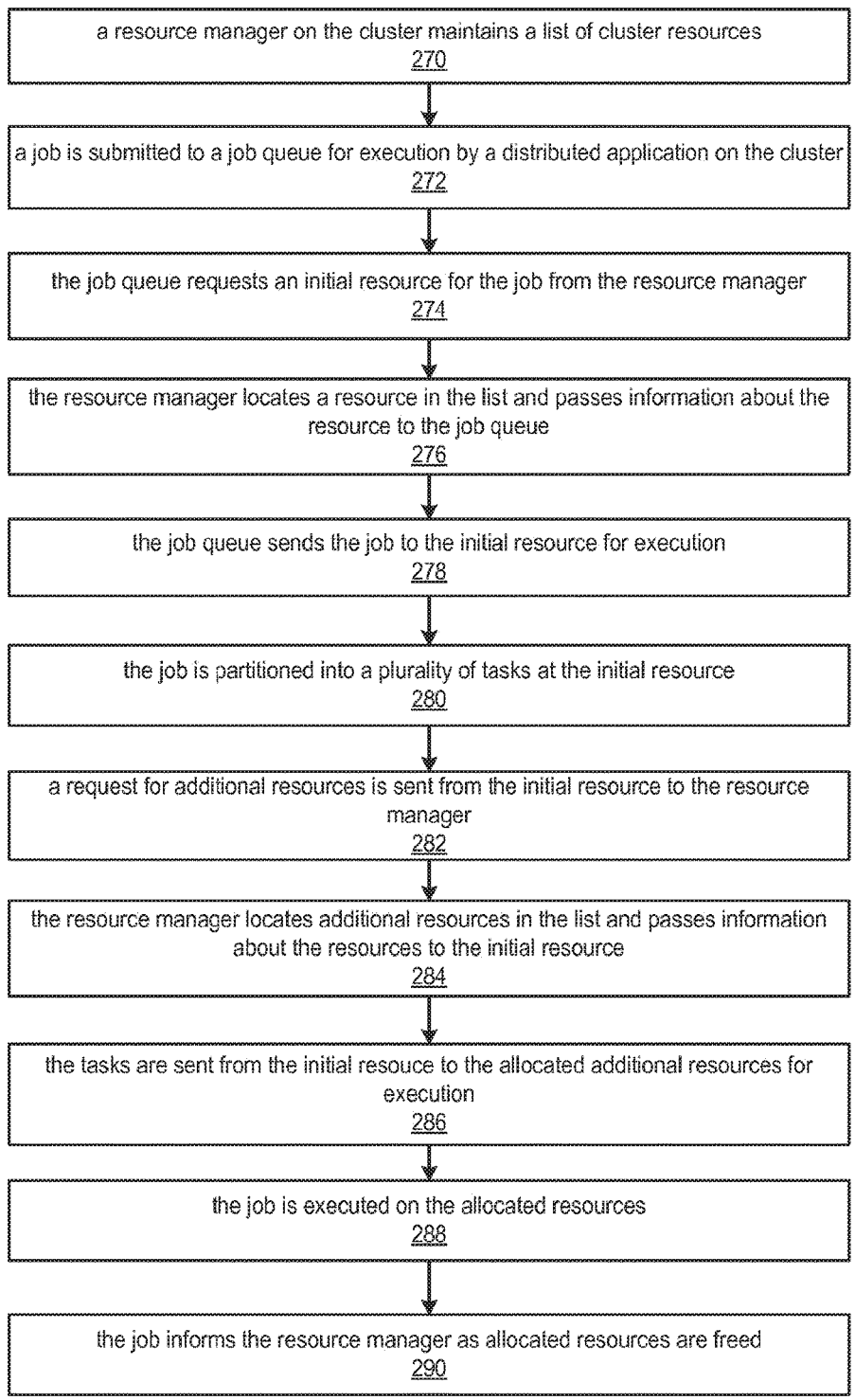
FIG. 2B is a flowchart illustrating a resource management technique, according to at least some embodiments.

FIG. 2B is a flowchart illustrating a resource management technique, according to at least some embodiments. As indicated at 270, a resource manager on a cluster maintains a list of cluster resources. For example, in some embodiments, the resource list may include an identifier for each resource, a resource location or address, and a status (e.g., initially "available"). In some embodiments, additional information about a resource may be included in the list. When a new compute node joins the cluster, or when a compute node leaves the cluster, the resource manager may be informed so that the resource list may be updated accordingly. As indicated at 272, a job may be submitted to a job queue for execution by a distributed application on the cluster. Note that there may be other jobs ahead of the submitted job in the job queue, so in some cases a submitted job may wait in the job queue before execution. In addition, some jobs may be submitted to execute at particular times, so a submitted job may not immediately be executed. As indicated at 274, the job queue may request an initial resource for the job from the resource manager when ready to begin the job. As indicated at 276, in response to the request, the resource manager may locate a resource in the list and pass information about the resource to the job queue. The resource manager may also change the status of the resource in the resource list, for example to "locked." If no resource is currently available, in some embodiments the resource manager may respond to inform the job queue that a resource is not available at this time. When a resource becomes available, the resource manager then informs the job queue.

In at least some embodiments, to provide event-driven behavior, the resource manager may either respond to a request for resources by acknowledging that the request was received, or may respond negatively if the request is invalid (e.g., due to invalid request parameters) or if there are errors in parsing the request. Thus, the resource manager may either respond to a resource request to affirm that the request has been received and will be fulfilled at some time in the future, or respond to inform the requestor that the request could not be registered. This response is not dependent on the number of resources that may or may not be available at that moment in time. Upon receiving an affirmative response, the expectation of the requestor is that the resource manager will fulfill that request at some point in the future without further action on the part of the requestor. If the resource manager instead responded negatively if no resources were available, this would require that the requestor either abandon its request for resources if none are immediately available, or continually poll the resources until it succeeded in making the call at a chance moment in time when resources were available.

As indicated at 278, after receiving the indication of the initial resource from the resource manager, the job queue sends the job to the initial resource for execution, for example to a compute node that is (or that includes) the initial resource. As indicated at 280, the job may be partitioned into a plurality of tasks at the initial resource. As indicated at 282, a request for additional resources may be sent from the initial resource (e.g., by the job on the initial resource) to the resource manager. As indicated at 284, the resource manager may locate additional resources in the list and pass information about the resources to the initial resource. The resource manager may also change the status of the resources in the resource list, for example to "locked." If not enough resources are currently available to meet the request for additional resources, the resource manager may allocate resources to the initial resource to meet the request as the resources become available.

As indicated at 286, the tasks are sent from the initial resource to the allocated additional resources for execution. As indicated at 288, the job is executed on the allocated resources. As indicated at 290, as resources complete their assigned tasks, the job (or the task) informs the resource manager so that the resource manager can update the status of the freed resources in the resource list and reassign the resources to meet other requests (either from this job or from another job).

Resource Management, Atomic-Level Tasks, and Resources

As has been noted, in at least some embodiments, a job may be partitioned into relatively small tasks, referred to herein as atomic tasks. In some embodiments, each task may be executable by a single processing thread on a computer system. At least some computer systems in the cluster may, for example, be multicore computer systems that support multiple concurrent processing threads. In at least some embodiments, the resources managed by the resource manager may be, or may include, processing threads.

Thus, in at least some embodiments, the resource manager does not need to be aware of the particular capabilities or configurations of individual machines in the cluster. From the resource manager's perspective, all of the resources are the same. Thus, a requestor seeking resources may simply inform the resource manager of the number of resources required, without having to specify any particular aspects of a desired resource. Similarly, a computer system joining the cluster does not need to inform the resource manager of any particular capabilities of the computer system other than the number of resources that the computer system is providing. The resource manager may thus simply manage a list of resources, with each resource only indicating its location (e.g., which computer system in the cluster provides the resource) and its state (e.g., available, locked, etc.)

Furthermore, the resource manager does not have to obtain and evaluate particular configurations of computer systems in the cluster to determine if their configurations support particular jobs for which resources are requested. Instead, a requestor simply informs the resource manager of how many resources it needs, and the resource manager grants resources as they become available. In contrast, in many conventional resource management techniques for cluster computing systems, a management system generally obtains particular configuration information from computer systems in the cluster (e.g., by polling), stores this configuration information, and evaluates requests for resources to determine particular computer systems that are suited to performing a particular job for which a request for resources has been made.

Figure 2C:
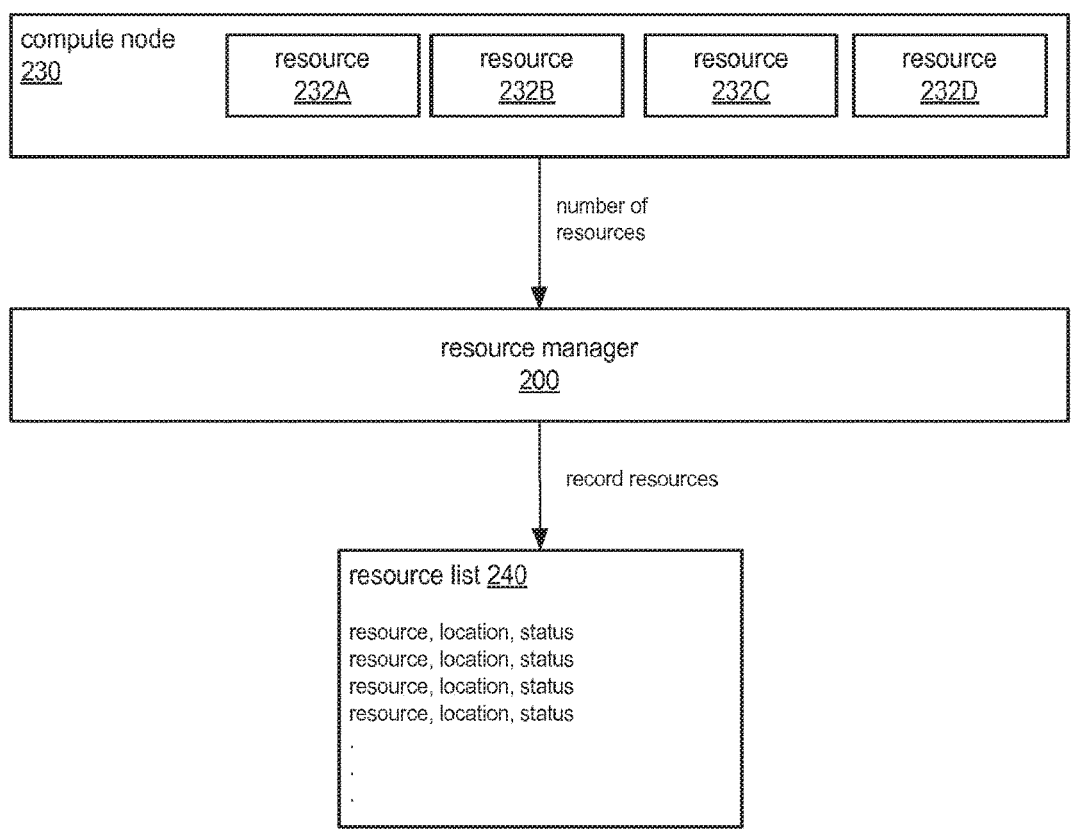
FIG. 2C illustrates a resource manager managing resources in a cluster, according to at least some embodiments.

FIG. 2C illustrates a resource manager managing resources in a cluster, according to at least some embodiments. A compute node 230 on the cluster, for example a new compute node joining the cluster, informs the resource manager 200 that it has resources available for allocation in the cluster. In this example, compute node 230 has four resources (resource 232A, 232B, 232C, and 232D) available. In at least some embodiments, the compute node 230 simply provides a count of resources (in this example, four) to the resource manager 200. Resource manager 200 records the resources in a resource list 240. For example, resource manager 200 may record an identifier for each resource, a resource location or address, and a status (e.g., initially "available"). In some embodiments, additional information about a resource may be obtained and stored.

Figure 2D:
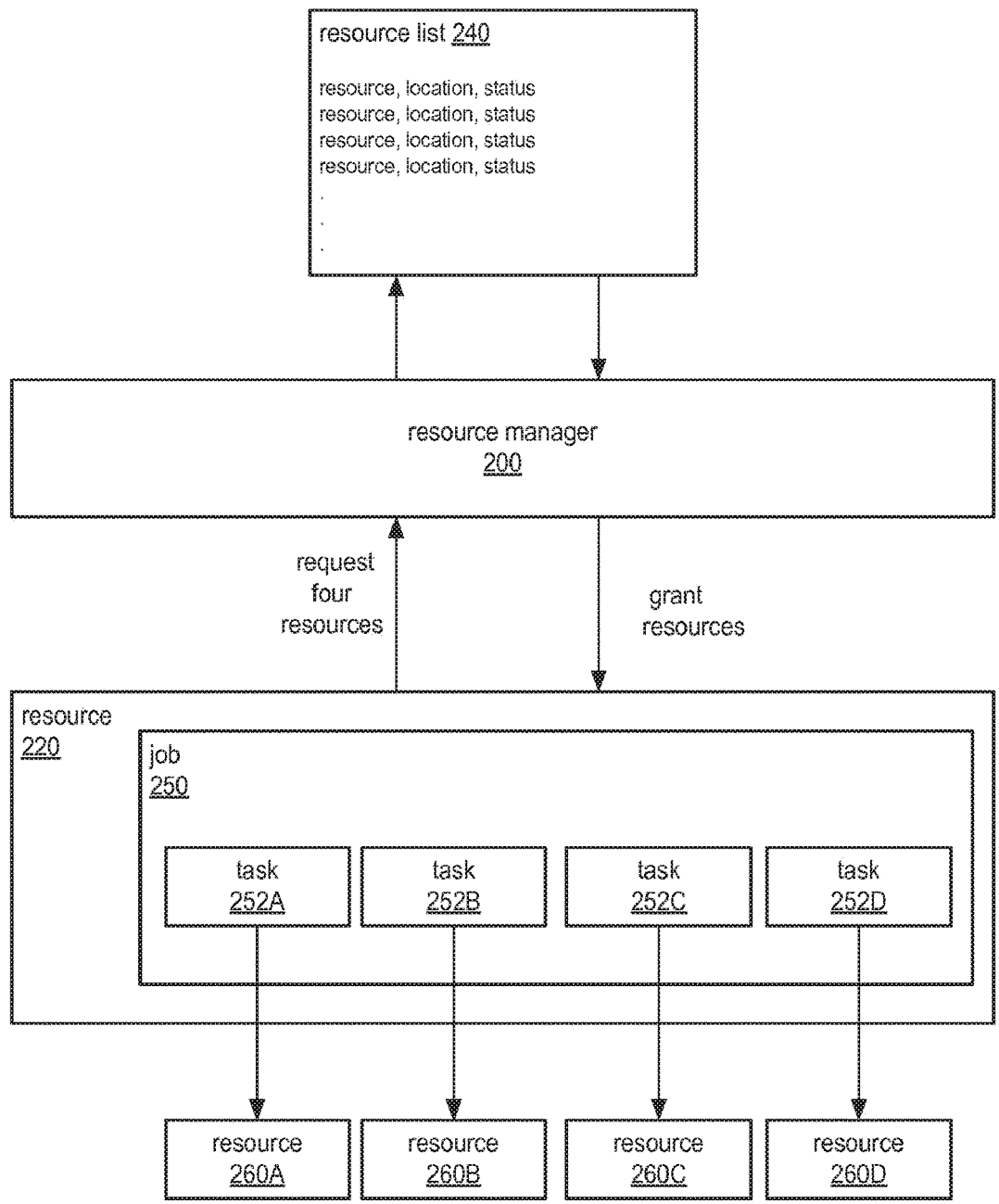
FIG. 2D illustrates breaking a job into tasks and assigning the tasks to resources via a resource manager, according to at least some embodiments.

FIG. 2D illustrates breaking a job into tasks and assigning the tasks to resources via a resource manager, according to at least some embodiments. A resource 220 may be assigned a job 230. The resource 220 may partition the job into a plurality of tasks (in this example, four tasks 252A, 252B, 252C, and 252D). The resource 220 may send a request to a resource manager 200 asking for four additional resources. In at least some embodiments, the resource manager 200 may not be informed of any particular aspects of the respective tasks; the resource 220 simply provides a count of resources needed. Resource manager 200 then checks the resource list 240 for available resources. In some embodiments, resource manager 200 may check the status of a resource to see if the resource is currently available (or is locked). Upon finding available resources, the resource manager 200 informs resource 220 of the available resources it is granting to the resource 220. The message or messages may, for example, indicate where each resource is located (e.g., the message may provide an address of some type via which resource 220 may communicate with the respective resource). The resource manager 200 may also change the status of the granted resources, for example to "locked", to indicate that the resources are in use. Note that, if not enough resources are available to meet the requested number, the resource manager may grant less than the requested number to the resource 220. As resources become available (e.g., via some other process freeing a resource or via another computer system joining the cluster and informing the resource manager 200 of resources it is providing), the resource manager 200 may grant the newly available resources to the resource 220 to fulfill the request.

In this example, resource manager grants resources 260A, 260B, 260C, and 260D to resource 220 to fulfill the request for resources. After resource manager 200 informs resource 220 of the granted resources, tasks 252A, 252B, 252C and 252D may be sent to the resources from resource 220 for processing.

In at least some embodiments, when an assigned task 252 is done with a respective resource 260, the task 252, or alternatively the job 250 on resource 220, may inform resource manager 200 that the respective resource is free. Resource manager 200 may then change the status of the respective resource to "available."

Limiting Job Resources

As previously noted, in at least some embodiments, an initial resource may partition a job into a plurality of tasks. However, this could potentially result in a particular job consuming most or all resources on a cluster, which may impact the timely performance of other jobs. Therefore, in some embodiments, a limit may be placed on the number of cluster resources that may be allocated at a given time to a given job to prevent particular jobs from overallocating resources on the cluster. In some embodiments, a submitted job may be analyzed, for example by the job queue, to determine a maximum number of resources that can be allocated to the job at one time. This resource limit may be passed to the compute node to which the job is sent; the application code on the compute node is thus informed of the maximum number of resources that the job can be allocated at a given time. When the compute node requests additional resources for the job, no more resources than this limit are requested. Note, however, that the compute node may not be required to request the maximum number of resources; fewer than the maximum may be requested. In at least some embodiments, the resource manager is not aware of, and is not involved in, imposing this limit on resource allocation.

The above method of limiting resource allocation is given by way of example. One of ordinary skill in the art will recognize that other methods of limiting resource allocation in a cluster computer system are possible and contemplated.

Job State Tracking

At least some embodiments may provide a state tracking technique that enables real-time tracking of jobs in the cluster via the state object. The state object described above allows a job to be implemented as a distributable database. Since a job is implemented as a distributable database, at least some embodiments may efficiently track the job, in real time, even while the job is processing in the cluster system. All information about a job is available through the job's mobile state object without the need to track the state in a centralized master database. Each job tracks its own details in its own state object; the cluster computing system as a whole tracks the location of the state objects for one or more jobs in a central database. Since the cluster system only requires the location of state objects to be tracked in a central database, only location information for a job's metadata, and not the metadata itself, is stored in the central database. This significantly reduces the amount of data stored in the central database, distributing the metadata across the cluster to various nodes that currently store state objects for jobs, thus improving the central database performance and reducing bandwidth requirements on the network. Information about a job/state may be acquired via a query to the central database to find the location of the respective state object, and then a query to the state object for the job to obtain the desired job metadata.

Embodiments may thus avoid the bottleneck problems of a central database that stores all metadata for all jobs, thus increasing the scalability of the application while also increasing the amount of metadata that can be accurately captured regarding a particular job. Moreover, job tracking may be built into the database class libraries, and thus job tracking may be automatically and transparently performed by the respective state object itself, and does not require polling of resources by a management node to track jobs as is required in many conventional cluster systems.

Figure 3A:
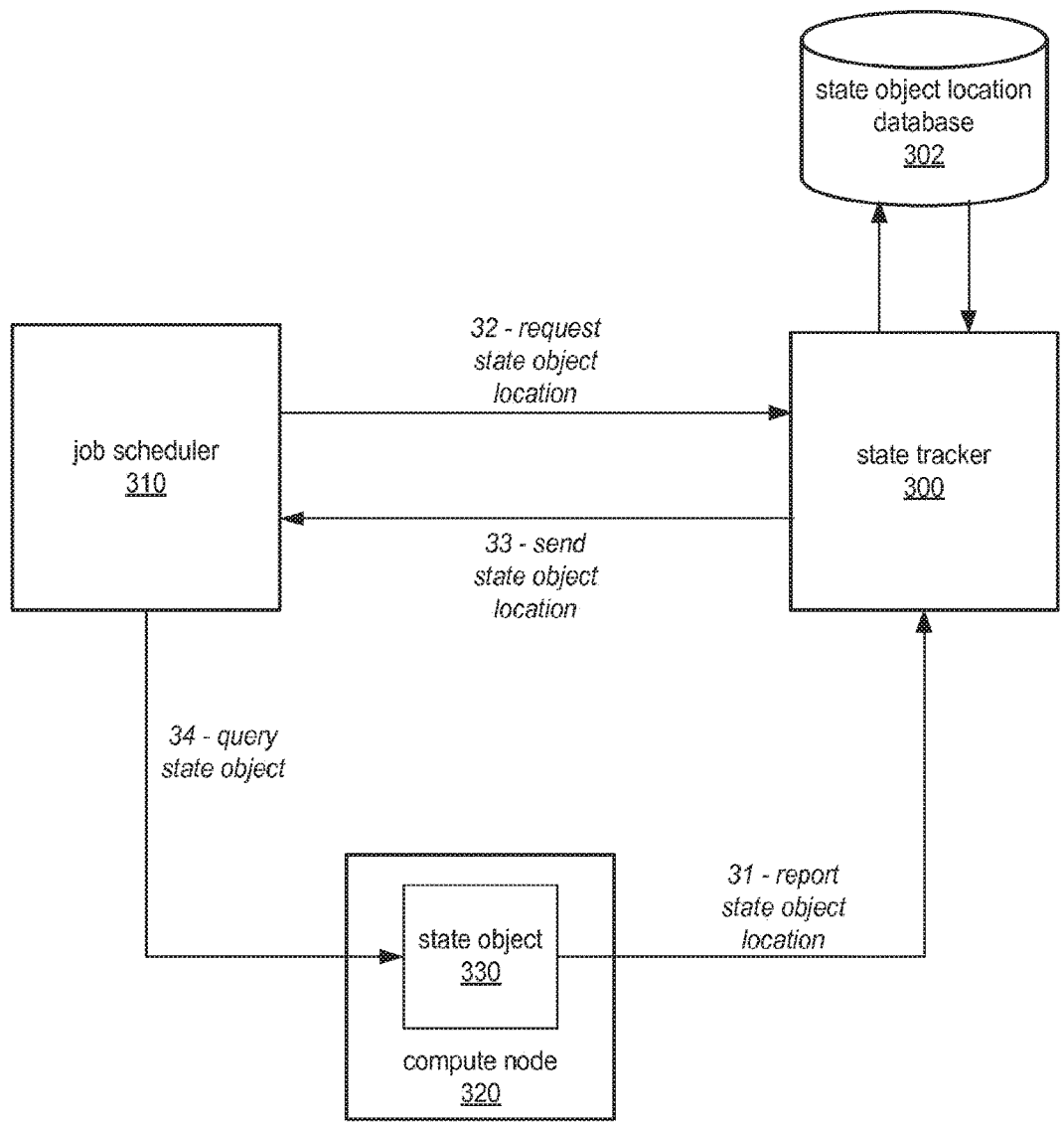
FIG. 3A illustrates job state tracking, according to at least some embodiments.

FIG. 3A illustrates job state tracking, according to at least some embodiments. A compute node 320 may be assigned or may be executing a job, and thus may include or obtain a state object 330 for the job. The job may have been originally assigned to the compute node 320 by job scheduler 310, or may have migrated to the compute node 320 from another compute node (not shown). At 31, the state object 330 may automatically inform a state tracker 300 of its location (e.g., by sending a URL or other address to the state tracker 300). State tracker 300 may record the identity and location of the state object 330 in state object location database 302. An entity wishing to make a query about the job status may query state tracker 300 to obtain the current location (e.g., URL or other address) of the state object 330. As an example, at 32, job scheduler 310 may query state tracker 300 to request the location of state object 330. At 33, state tracker 300 responds by sending the current location of state object 330 to job scheduler 310. At 34, job scheduler may then send one or more queries to state object 330 to obtain desired information.

In at least some embodiments, a web interface, or some other interface, may be provided via which a user (e.g., the job scheduler) may remotely request job information from a job state object via a web browser according to a current location (e.g., a URL or other address) provided to the interface by the state tracker. In some embodiments, the provided interface may directly access the state object via the URL or other address. In other embodiments, if the data center hosting the cluster does not wish to allow external access of data, the data may be proxied for access by the requestor so that external access to the data is not granted. Thus, in these embodiments, in response to at least some requests for resources, instead of returning an address of the state object, the state tracker may return an address of a proxy to the state object.

In at least some embodiments, a job may migrate from one compute node to another compute node on a cluster. When a job migrates, the state object 330 moves to the new compute node, and the state object 330 automatically informs state tracker 300 of the move, and of its new location (e.g., a new URL or other address). State tracker 300 then updates the location of the state object 330 in database 302.

In some embodiments, informing the state tracker 300 of the new location may be performed at the sending compute node rather than at the receiving compute node. This may, for example, prevent a failure in job tracking from impacting processing. The destination compute node can immediately begin processing the job without waiting for the tracking update to complete. If there is a problem in tracking, the system might lose track of the job, but the receiving compute node can continue to process the job. Furthermore, the sending compute node knows both its own identity and the identity of the destination compute node, while the destination compute node does not necessarily know where the state object 330 was transferred from, for example due to NAT, proxies, and so on.

In some embodiments, the state tracker 300 is not informed of the move until after the transfer has successfully completed, not before the transfer or during the transfer, so that the location of the state object 330 is not updated in database 302 until the state object 330 has been successfully moved to the new compute node.

In some embodiments, to help prevent a failure in job tracking, the sending compute node may temporarily cache the new location of the state object 330 following a successful transfer. In the event that the transfer was successful, but the update of the tracking database 302 either fails or is delayed (e.g., due to network latency, etc), the job may still be located via the cache. If, for example, a process queries the tracking database 302 in the period of time after a job has been transferred but before the tracking database 302 has been updated with the new location, the old (outdated) location may be returned. If an attempt is made to query the state object 330 at this outdated location, the sending compute node may: return the new location of the state object 330 from the cache; transparently forward the request to the new location (e.g. an HTTP redirect using a 301 status code); or return a status indicating that location is no longer valid (e.g. an HTTP 404 status code).

In the event that the request is not redirected or an updated location is not returned, the requestor may repeat the request for the location from the tracking database 302, possibly after a short delay.

In the event that the state object is successfully transferred, but the update of the location update is delayed (again, due to network latency, etc), it is possible that the state file may be transferred again, and the tracking database may be updated before the original transfer can be recorded. Or, the state file may be transferred several times in rapid succession. In either case, there is a possibility that the updates to the tracking database my arrive "out of order". The node responsible for sending the new location to tracking database wish to include additional information along with the location (e.g., timestamp generated at the time of transfer, an incremental counter, etc), sufficient to allow the tracking database to determine if the update location supersedes the current location.

In at least some embodiments, the state object 330 may be purged or deleted after job completion, or alternatively may be maintained somewhere on the cluster. If the state object 330 is maintained after job completion, the state tracker 300 may be informed of the state object's location on the cluster.

State Tracking Flowcharts

Figure 3B:
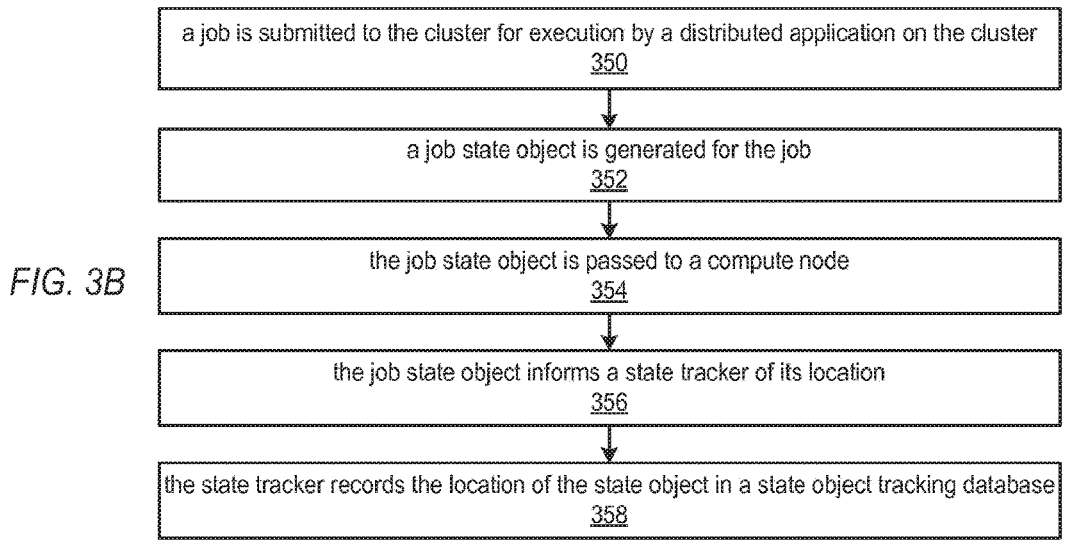
FIG. 3B is a flowchart of a method for recording an initial location of a state object, according to at least some embodiments.
Figure 3C:
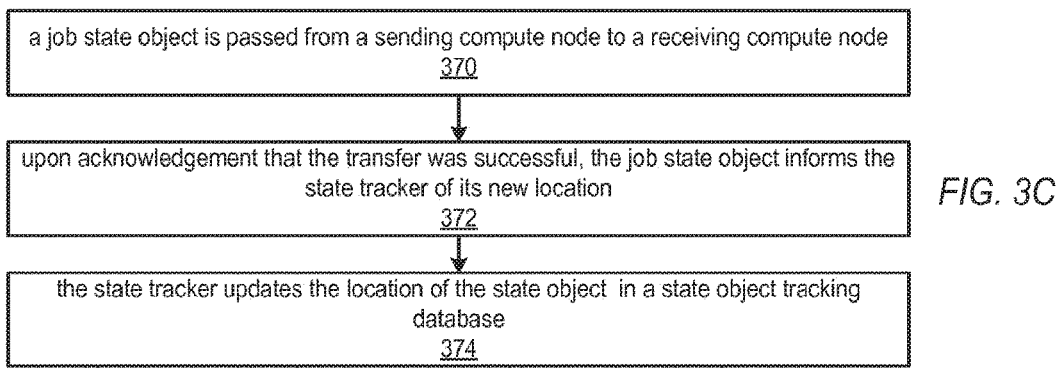
FIG. 3C is a flowchart of a method for tracking a transferred state object, according to at least some embodiments.
Figure 3D:
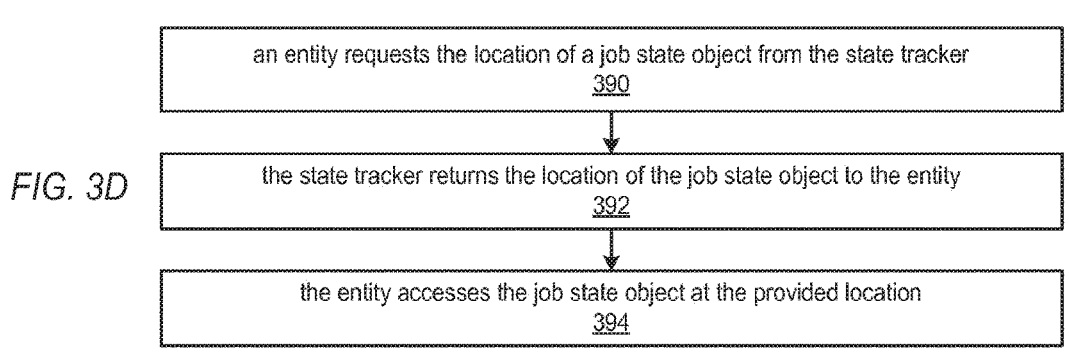
FIG. 3D is a flowchart of a method for accessing a job state object, according to at least some embodiments.

FIGS. 3B, 3C, and 3D are flowcharts of various aspects of a state tracking technique, according to at least some embodiments.

FIG. 3B is a flowchart of a method for recording an initial location of a state object, according to at least some embodiments. As indicated at 350, a job is submitted to the cluster for execution by a distributed application on the cluster. As indicated at 352, a job state object is generated for the job. As indicated at 354, the job state object is passed to a compute node on the cluster. As indicated at 356, the job state object informs a state tracker of its location. As indicated at 358, the state tracker records the location of the state object in a state object tracking database.

FIG. 3C is a flowchart of a method for tracking a transferred state object, according to at least some embodiments. As indicated at 370, a job state object is passed from a sending compute node to a receiving compute node. As indicated at 372, upon acknowledgement that the transfer was successful, the job state object informs the state tracker of its new location. In at least some embodiments, this is performed from the sending compute node. As indicated at 374, the state tracker updates the location of the state object in the state object tracking database.

FIG. 3D is a flowchart of a method for accessing a job state object, according to at least some embodiments. As indicated at 390, an entity requests the location of a job state object from the state tracker. As indicated at 392, the state tracker returns the location (e.g., a URL or other address or identifier) of the job state object to the entity. In at least some embodiments, if the state tracker cannot locate the requested state object, the state tracker may inform the requesting entity that the state object cannot be found. As indicated at 394, the entity accesses the job state object at the provided location. In some embodiments, the state tracker may return an address of a proxy to the state object, rather than an address of the state object itself.

Example Cluster Computing System

Figure 4:
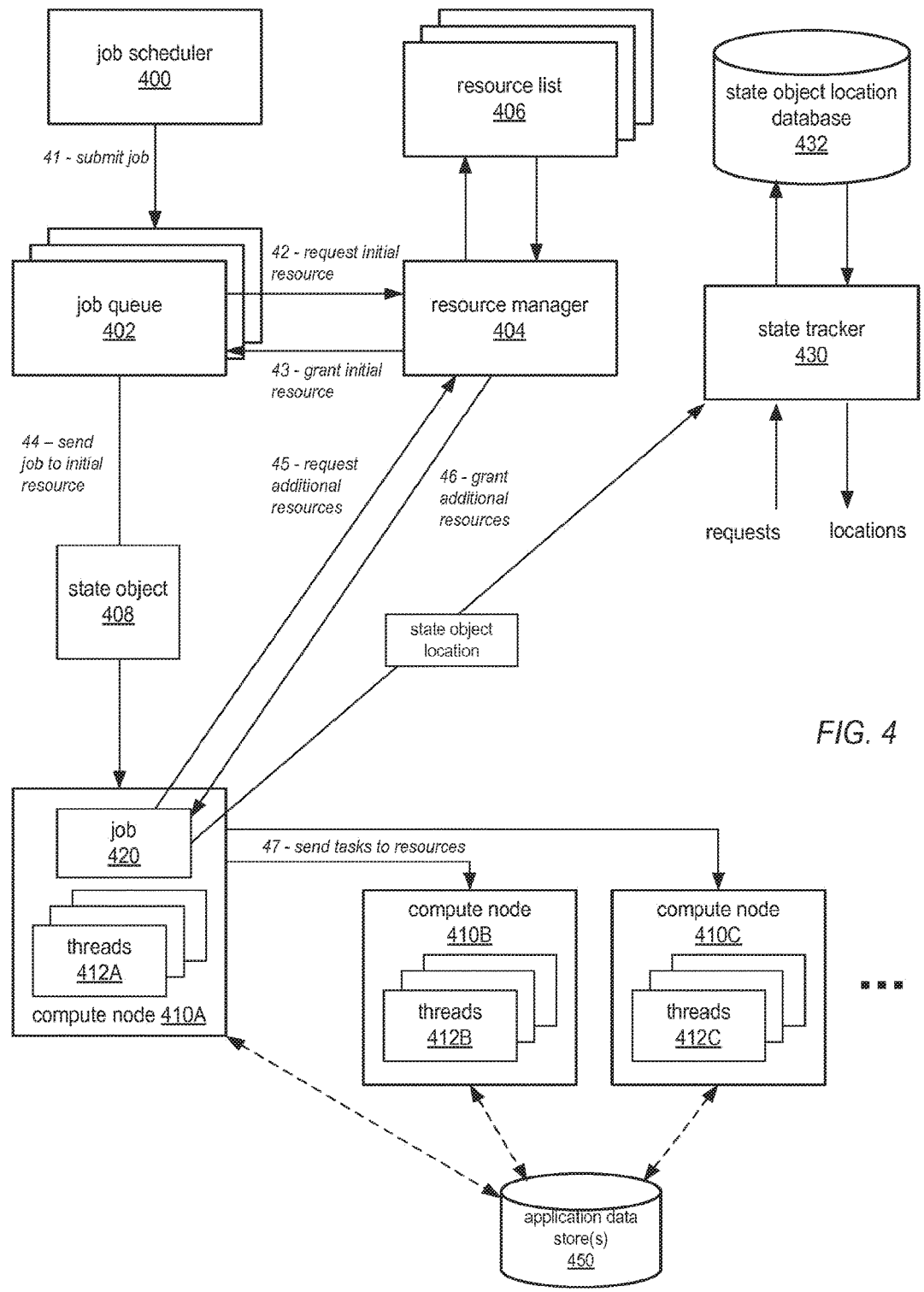
FIG. 4 is a block diagram illustrating an example cluster computing system implemented according to at least some embodiments.

FIG. 4 is a block diagram illustrating an example cluster computing system implemented according to at least some embodiments, and shows at least some of the data flow in a cluster computing system implementing at least the resource management technique described herein. This example also shows a state object implementation and a state tracking technique implementation according to embodiments; however, as previously noted, the resource management technique may be implemented independently of these techniques.

A resource manager 404 maintains a resource database that indicates resources (e.g., compute nodes 410 and threads 412) on the cluster and their current status (available, locked, etc.) At 41, job scheduler 400 submits a job to a job queue 402. Note that there may be one or more jobs in job queue 402. At 42, when a job is ready to be executed by the cluster system, the job queue 402 (or, in some embodiments, the job itself) requests an initial resource from resource manager 404. At 43, when a suitable resource is available, resource manager 404 grants access to that resource (in this case, compute node 410A) to the job. At 44, the job 420 is then sent to the respective initial resource (in this example, to compute node 410A). On the compute node (compute node 410A, in this example), the job 420 may be analyzed to break the job 420 down into two or more atomic tasks, with each task executable by a resource (e.g., a thread) on the cluster. At 45, the compute node 410A requests one or more additional resources from the resource manager 404. If resources are available as indicated by the resource database 406, the resource manager 404 grants access to those resources to the requesting resource (in this example, compute node 410A), as indicated at 46. If no or not enough resources are available, the resource manager 404 may wait until additional resources are available to grant access. For example, a compute node 410 may free resources when a job is done with them. Note that a resource is freed by an event—a "free resource" event—that is received by the resource manager 404 from a job that is through with the respective resource. Resources may otherwise become available, for example by a new compute node 410 joining the cluster.

At 47, on compute node 410A, one or more tasks for the job 420 may be distributed to resources that have been allocated to the job 402, for example to threads 412 on other compute nodes 410 or to threads 412 on the compute node 410A itself. The resources may then execute their assigned tasks. In some implementations, a task executing on a resource may access other cluster resources; for example, one or more resources executing tasks may access an application data store 450 as shown in FIG. 4. When a task is completed on a resource, the task or job 420 may inform the resource manager 404 that the resource is free, i.e. that the task or job 420 no longer needs the resource.

As can be seen from the above, resource management according to embodiments of the resource management technique is event-driven—events generate requests for resources, allocation of resources, and release of resources. Unlike conventional cluster systems that rely on polling in resource management, this event-driven resource management does not require periodic polling, and thus requires less network traffic (messages are only sent when triggered by an event). Furthermore, since polling is not required, events are generated and are quickly serviced in real-time or near-real-time as compared to systems that use polling for resource management, where job needs may not be known or responded to until a next polling interval, which in some cases may be several seconds.

In at least some embodiments, sending a job to a resource may involve generating and sending a state object 408 as described herein for the job to the resource (in this example, compute node 410A). Note that the state object 408 may be generated for the job at the time of job submission as indicated at 41. In at least some embodiments, the state object 408 may inform a state tracker process 430 of its current location; the state tracker process 430 maintains a state object location database 432 that stores the current location of state objects 408 in the cluster. During execution of the job, the state object 408 may be passed to other resources (e.g., to other compute nodes 410), at which point the state object 408 may inform the state tracker process 430 of its new location. Metadata for the job may be stored in the state object 408. To obtain information about the status of a job, an entity (e.g., job scheduler 400) may request the location of the state object 408 from the state tracker process, and then query the state object 408 at its location.

Since the state object 408 is a stand-alone database, the state object 408 tracks the status of the job as it executes on the cluster. For example, the state object 408 may record one or more of the job's initial submission (see 41), the request for initial resource (see 42), the allocation of the initial resource (see 43), the transition of the job (and the state object 408) to its initial resource (see 44), the request for additional resources (see 45), the assignment of additional resources (see 46), the distribution of tasks (see 47), the release of resources when the job is done with them, the forwarding of the job (and the state object 408) to a different compute node, and so on.

While FIG. 4 shows a single job submitter 400, job queue 402, resource manager 404, and resource database 406, some embodiments or implementations may include two or more of each of these components. For example, in some embodiments, a cluster may include two or more resource managers 404, which may each maintain a separate resource database 406. Each resource manager 404 may manage a subset of the resources on the cluster. Multiple resource managers 404 may, for example, be used to segment the cluster according to a use model, for example high-priority and low-priority customers, where one subset of the resources on the cluster are assigned to the high-priority customers and another subset of the resources are assigned to the low-priority customers. As another example, a cluster may be segmented according to applications, with a separate independent application assigned to each resource manager 404.

Example System

Figure 5:
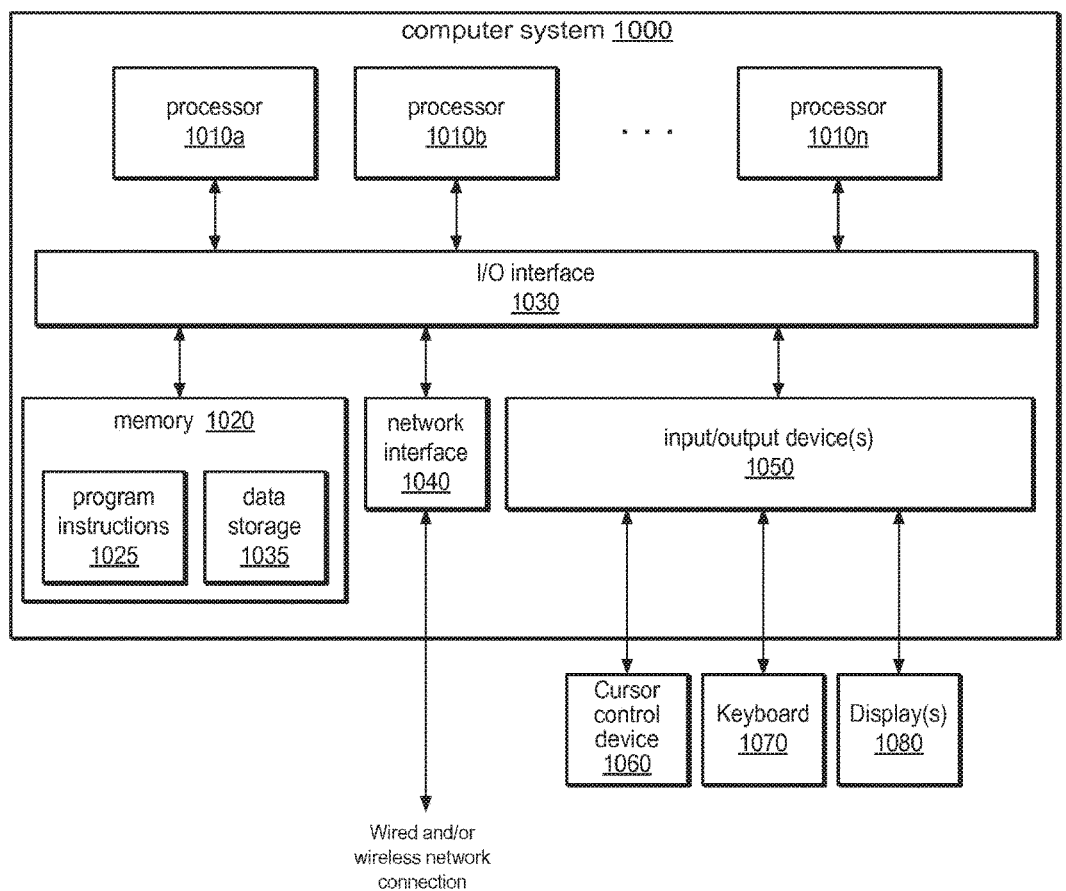
FIG. 5 illustrates an example computer system that may be used in embodiments.

Embodiments of the various cluster computing components, nodes, methods and techniques as described herein may be implemented and/or executed on one or more computer systems, which may interact with various other devices. One such computer system is illustrated by FIG. 5. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the image processing methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of various cluster computing components, methods and techniques are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 5, memory 1020 may include program instructions 1025, configured to implement embodiments of the various cluster computing components, methods and techniques as described herein, and data storage 1035, comprising various data accessible by program instructions 1025. In one embodiment, program instructions 1025 may include software elements of embodiments of the various cluster computing components, methods and techniques as illustrated in the above Figures. Data storage 1035 may include data that may be used in embodiments. In other embodiments, other or different software elements and data may be included.

Those skilled in the art will appreciate that computer system 1000 is merely illustrative and is not intended to limit the scope of the various cluster computing components, methods and techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

The invention claimed is:

1. A method for tracking jobs performed by computing nodes of a cluster computing system, the method comprising:

monitoring, by a management computer, a plurality of computing nodes and an availability of resources provided by the plurality of computing nodes in the cluster computing system;

identifying, by the management computer, a first computing node of the plurality of computing nodes that is available for performing a first job submitted to a job queue;

identifying, by the management computer, a second computing node of the plurality of computing nodes that is available for performing a second job submitted to the job queue;

generating a first job state object specific to the first job for tracking a first job status of the first job and a second job state object specific to the second job for tracking a second job status of the second job;

providing the first job state object to the first computing node and the second job state object to the second computing node;

updating, after completion of a task of the first job, the first job state object independently of any updates to the second job state object after completion of a task of the second job; and updating, after completion of the task of the second job, the second job state object independently of any updates to the first job state object after completion of the task of the first job.

2. The method of claim 1, further comprising:

generating a task state object for tracking a task status for the task of the first job;

providing the task state object to the first computing node; and updating the task state object in response to completing the task.

3. The method of claim 1, wherein a first computer independent of the management computer updates the first job state object and a second computer independent of the management computer updates the second job state object, wherein the method further comprises transmitting, by a job scheduling system, the first job state object to the first computer and the second job state object to the second computer.

4. The method of claim 3, further comprising transmitting, by at least one of the first computer and the second computer, job metadata extracted from at least one of the first job state object and the second job state object in response to a job status query from the job scheduling system, wherein the job metadata is indicative of an updated job status for at least one of the first job and the second job.

5. The method of claim 4, wherein the first job state object comprises a first database storing first job metadata indicative of the first job status as a plurality of records in the first database and application code executable by the first computer to receive database queries and retrieve a subset of the plurality of records from the first database in response to the job status query, wherein the second job state object comprises a second database storing second job metadata indicative of the second job status as a plurality of records in the second database and application code executable by the second computer to receive database queries and retrieve a subset of the plurality of records from the second database in response to the job status query.

6. The method of claim 3, further comprising:

transmitting the updated first job state object from the first computer to an additional computer independent of the management computer for performing an additional task associated with the first job;

updating, by the additional computer, the first job state object subsequent to performing the additional task associated with the first job.

7. The method of claim 1, further comprising:

partitioning each of the first job and the second job into a plurality of tasks;

partitioning each of the first job state object and the second job state object into a plurality of task state objects, wherein each of the plurality of task state objects is configured for tracking a respective one of the plurality of tasks;

distributing the plurality of tasks and the plurality of task state objects to at least some computing nodes from the plurality of computing nodes; and updating, by each of the at least some computing nodes, a respective task state object subsequent to performing a respective task.

8. The method of claim 1, wherein the first job state object comprises first application code executable by the first computing node to perform operations for updating the first job state object after the completion of the task of the first job, wherein the second job state object comprises second application code executable by the second computing node to perform operations for updating the second job state object after the completion of the task of the second job.

9. The method of claim 1, wherein the first job state object is a first stand-alone object and the second job state object is a second stand-alone object.

10. A system for tracking jobs performed by computing nodes of a cluster computing system, the system comprising:

a management computer configured for:
monitoring a plurality of computing nodes and an availability of resources provided by the plurality of computing nodes in the cluster computing system,
identifying a first computing node of the plurality of computing nodes that is available for performing a first job submitted to a job queue, and
identifying a second computing node of the plurality of computing nodes that is available for performing a second job submitted to the job queue; and at least one computer in communication with the management computer and independent of the management computer, the at least one computer configured for:
generating a first job state object specific to the first job for tracking a first job status of the first job and a second job state object specific to the second job for tracking a second job status of the second job,
providing the first job state object to the first computing node and the second job state object to the second computing node,
updating, after completion of a task of the first job, the first job state object independently of any updates to the second job state object after completion of a task of the second job, and
updating, after completion of the task of the second job, the second job state object independently of any updates to the first job state object after completion of the task of the first job.

11. The system of claim 10, wherein the at least one computer is further configured for:
generating a task state object for tracking a task status for the task of the first job;
providing the task state object to the first computing node; and updating the task state object in response to completing the task.

12. The system of claim 10, wherein the at least one computer comprises:
a first computer that is configured for updating the first job state object; and
a second computer that is configured for updates the second job state object,
wherein the system further comprises a job scheduling system configured for transmitting the first job state object to the first computer and the second job state object to the second computer.

13. The system of claim 12, wherein at least one of the first computer and the second computer is configured for transmitting job metadata extracted from at least one of the first job state object and the second job state object in response to a job status query from the job scheduling system, wherein the job metadata is indicative of an updated job status for at least one of the first job and the second job.

14. The system of claim 13, wherein the first job state object comprises a first database storing first job metadata indicative of the first job status as a plurality of records in the first database and application code executable by the first computer to receive database queries and retrieve a subset of the plurality of records from the first database in response to the job status query,
wherein the second job state object comprises a second database storing second job metadata indicative of the second job status as a plurality of records in the second database and application code executable by the second computer to receive database queries and retrieve a subset of the plurality of records from the second database in response to the job status query.

15. The system of claim 12, wherein the first computer is configured for transmitting the updated first job state object to an additional computer independent of the management computer for performing an additional task associated with the first job;
wherein the system further comprises the additional computer, wherein the additional computer is configured for updating the first job state object subsequent to performing the additional task associated with the first job.

16. The system of claim 10, the at least one computer is further configured for:
partitioning each of the first job and the second job into a plurality of tasks;
partitioning each of the first job state object and the second job state object into a plurality of task state objects, wherein each of the plurality of task state objects is configured for tracking a respective one of the plurality of tasks; and
distributing the plurality of tasks and the plurality of task state objects to at least some computing nodes from the plurality of computing nodes,
wherein each of the at least some computing nodes is configured for updating a respective task state object subsequent to performing a respective task.

17. A non-transitory computer-readable medium having program code stored thereon that is executable by a processor for tracking jobs performed by computing nodes of a cluster computing system, the program code comprising:
program code for monitoring, by a management computer, a plurality of computing nodes and an availability of resources provided by the plurality of computing nodes in the cluster computing system;

program code for identifying, by the management computer, a first computing node of the plurality of computing nodes that is available for performing a first job submitted to a job queue;

program code for identifying, by the management computer, a second computing node of the plurality of computing nodes that is available for performing a second job submitted to the job queue;

program code for generating a first job state object specific to the first job for tracking a first job status of the first job and a second job state object specific to the second job for tracking a second job status of the second job;

program code for providing the first job state object to the first computing node and the second job state object to the second computing node;

program code for updating, after completion of a task of the first job, the first job state object independently of any updates to the second job state object after completion of a task of the second job;

program code for updating, after completion of the task of the second job, the second job state object independently of any updates to the first job state object after completion of the task of the first job.

18. The non-transitory computer-readable medium of claim 17, wherein the program code further comprises:
program code for generating a task state object for tracking a task status for the task of the first job;
program code for providing the task state object to the first computing node; and
program code for updating the task state object in response to completing the task.

19. The non-transitory computer-readable medium of claim 17, wherein the program code further comprises program code for transmitting, by a job scheduling system, the first job state object to a first computer independent of the management computer and the second job state object to a second computer independent of the management computer.

20. The non-transitory computer-readable medium of claim 19, wherein the program code further comprises program code for transmitting, by at least one of the first computer and the second computer, job metadata extracted from at least one of the first job state object and the second job state object in response to a job status query from the job scheduling system, wherein the job metadata is indicative of an updated job status for at least one of the first job and the second job.

* * * * *